United States Patent
Leonard

[11] 3,882,321
[45] May 6, 1975

[54] VEHICLE ELECTRICAL SYSTEMS

[75] Inventor: Gordon Harris Leonard, Chalfont St. Peter, England

[73] Assignee: C. A. V. Limited, Birmingham, England

[22] Filed: Nov. 5, 1973

[21] Appl. No.: 412,824

Related U.S. Application Data
[63] Continuation-in-part of Ser. No. 332,141, Feb. 13, 1973, abandoned.

[30] Foreign Application Priority Data
Feb. 19, 1972 United Kingdom................. 7782/72

[52] U.S. Cl.................. 307/10 LS; 315/82; 340/84
[51] Int. Cl............................................. H02g 3/00
[58] Field of Search............ 307/9, 10 R, 10 LS, 36, 307/37, 38, 39; 315/77, 78, 80, 82, 83; 340/74, 76; 280/204, 422

[56] References Cited
UNITED STATES PATENTS

| | | | |
|---|---|---|---|
| 2,975,297 | 3/1961 | O'Neil | 307/10 LS |
| 3,060,407 | 10/1962 | Beiswenger | 340/84 |
| 3,467,830 | 9/1969 | Dobrikin | 307/10 LS |
| 3,671,757 | 6/1972 | Klein | 307/10 LS |

*Primary Examiner*—Herman J. Hohauser
*Attorney, Agent, or Firm*—Holman & Stern

[57] ABSTRACT

A vehicle electrical system includes a load sensitive unit which normally controls or senses the operation of lamps the system including an additional lamp which can be connected in parallel with the lamps. The connection of the additional lamp is sensed by sensing means associated with a further lamp which is connected to the vehicle electrical system at the same time as the additional lamp, the sensing of the further lamp being utilised to adjust the characteristics of the device.

9 Claims, 3 Drawing Figures

VEHICLE ELECTRICAL SYSTEMS

This application is a continuation in part application of my application Ser. No. 332,141 filed Feb. 13, 1973 and now abandoned.

The invention described herein relates to vehicle electrical systems of the kind comprising a load sensitive unit which controls and/or senses current flow from a first point of electric supply on the vehicle to a first lamp on the vehicle, the system being adapted to have a second lamp connected in parallel with the first lamp, said second lamp being associated with a third lamp which when said second lamp is connected in parallel with said first lamp, is connected to a second supply point of the vehicle.

The object of the invention is to provide such a system in a simple and convenient form.

According to the invention a system of the kind specified comprises means for sensing the connection of said third lamp to said second supply point and for modifying the operating characteristics of said unit.

According to a further feature of the invention the continuity of said third lamp is sensed when it is unlit, and the current flowing through said third lamp is sensed when it is lit, to modify the operating characteristics of the unit.

Figure 1:
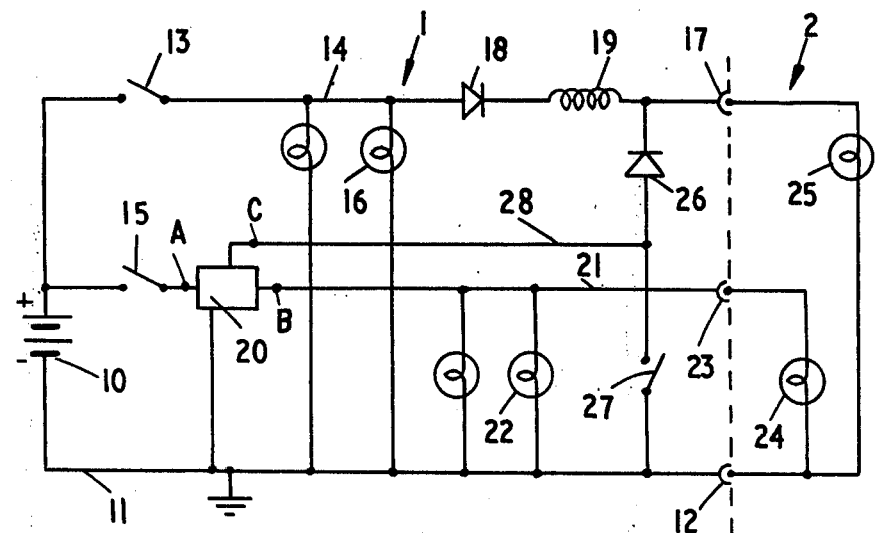
FIG. 1 shows a circuit diagram of one example of a vehicle electrical system in accordance with the invention.

With reference to FIG. 1 of the drawings there is shown a portion 1 of the electrical system of a tractor and a portion 2 of the electrical system of a trailer which can be towed by the tractor. The two systems are interconnected by a plug and socket connection so that the electrical system of the trailer is powered and controlled by the electrical system of the tractor.

The tractor electrical system includes an accumulator 10 the negative terminal of which is connected to an earth line 11 which extends to a socket 12. The positive terminal of the accumulator may be connected by a switch 13 to a line 14. Connected between the lines 14 and 11 are lamps 16 forming part of the side lamp-/tail lamp system of the tractor. The line 14 is connected to a socket 17 by way of a diode 18 and the winding 19 of a relay.

Also provided is a switch 15 which through the intermediary of a load sensitive unit 20 is connected to a line 21 and extending between the line 21 and the line 11 are a first series of lamps 22 which may for instance be part of the direction or turn indicator system of the tractor. In this case the load sensitive unit 20 will be an intermittent switch. The line 21 is connected to a socket 23 and the tractor has a second lamp or lamps 24 which can be connected between the sockets 23 and 12 so that the lamp 24 will be illuminated at the same time as the lamps 22. In addition the trailer electrical system includes a third lamp 25 which can be connected between the sockets 17 and 12 so that it will be illuminated when the lamps 16 are illuminated.

The intermittently operated switch 20 which will be described later in detail, has an operating characteristic which depends upon the load connected to it and it will be seen that if the lamp 24 is connected in parallel with the lamps 22 as will be the case when the trailer is being towed by the tractor then the current flow will be greater than when the tractor alone is being used. The operating characteristics of the switch 20 will therefore be upset and in many cases the rate of flashing of the lamps will vary. Even if the rate of flashing does not vary the switch 20 may be of the type which incorporates circuits which provide an indication in the event that one of the bulbs 22 has failed and it will be understood that the operation of these circuits will be upset by the additional lamp 24 connected in parallel with the lamps 22.

In such circumstances it is known in vehicle electrical systems of this type to modify the circuit of the switch 20 when the trailer is connected to the tractor. In the past this has been achieved by providing another socket which when the trailer is connected to the tractor is effectively earthed. This arrangement however is inconvenient since it involves the provision of a larger number of sockets and also the corresponding pins in the plug and socket connector.

The difficulty is overcome by providing the diode 18, the relay coil 19 and a further diode 26 which is connected in series with a normally open relay contact 27 between the sockets 17 and 22. The diode 26 has its cathode connected to the socket 17 and the anode of the diode 26 is connected to the switch 20 by means of a line 28. The line 28 when connected to line 11 modifies the operating characteristics of the switch 20 to take into account the additional lamp load.

The circuit operates as follows; assuming that the trailer is connected to the tractor. When the switch 13 is open the line 28 will effectively be connected to the line 11 by way of the diode 26 and the lamp 25. Thus if the switch 15 is operated the lamps 22 and 24 will operate at the correct frequency or alternatively failure of one of these lamps will be correctly indicated. In the event that the switch 13 is closed so that the lamps 16 and 25 will be illuminated then the diode 26 will be reverse biased however, the current flowing through the relay coil 19 to the lamp 25 will effect closure of the relay contact 27 and this directly connects the line 28 to the line 11. The diode 18 is provided to ensure that when the switch 13 is open the line 28 is not effectively connected to the line 11 by way of the lamps 16.

Figure 2:
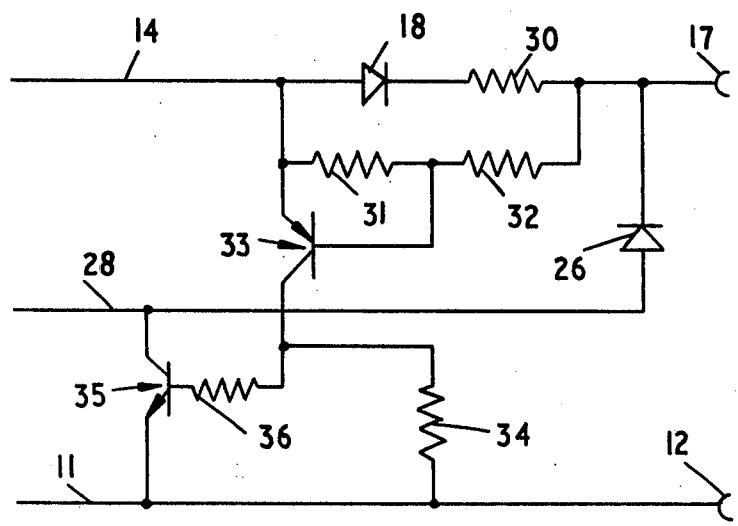
FIG. 2 shows a modification of the system of FIG. 1.

An alternative circuit is shown in FIG. 2 and like reference numerals have been utilised wherever possible. In this circuit the relay coil 19 is replaced by a resistor 30 and connected in parallel with the diode 18 and the resistor 30 is the series combination of resistors 31 and 32. A point intermediate resistors 31 and 32 is connected to the base of a p-n-p transistor 33 the emitter of which is connected to the anode of the diode 18 and the collector of which is connected to line 11 by way of resistor 34.

In addition the collector of transistor 33 is connected to the base of an n-p-n transistor 35 through a resistor 36. The emitter of transistor 35 is connected to line 11 and the collector of which is connected to line 28. In operation, when switch 13 is opened the circuit functions exactly as the circuit shown in FIG. 1 that is to say line 28 is effectively connected to line 11 by way of diode 26 and the third lamp 25. In this condition both transistors are in the non conducting state. When switch 13 is closed and with the third lamp 25 connected to the socket 17 then a voltage will be developed across the diode 18 and the resistor 30. This voltage is tapped by the resistors 31 and 32 to provide forward bias for transistor 33 thereby turning this transistor on to provide forward bias for transistor 35. This therefore is turned on and forms the equivalent of the closed relay contact 27 of the circuit shown in FIG. 1.

Figure 3:
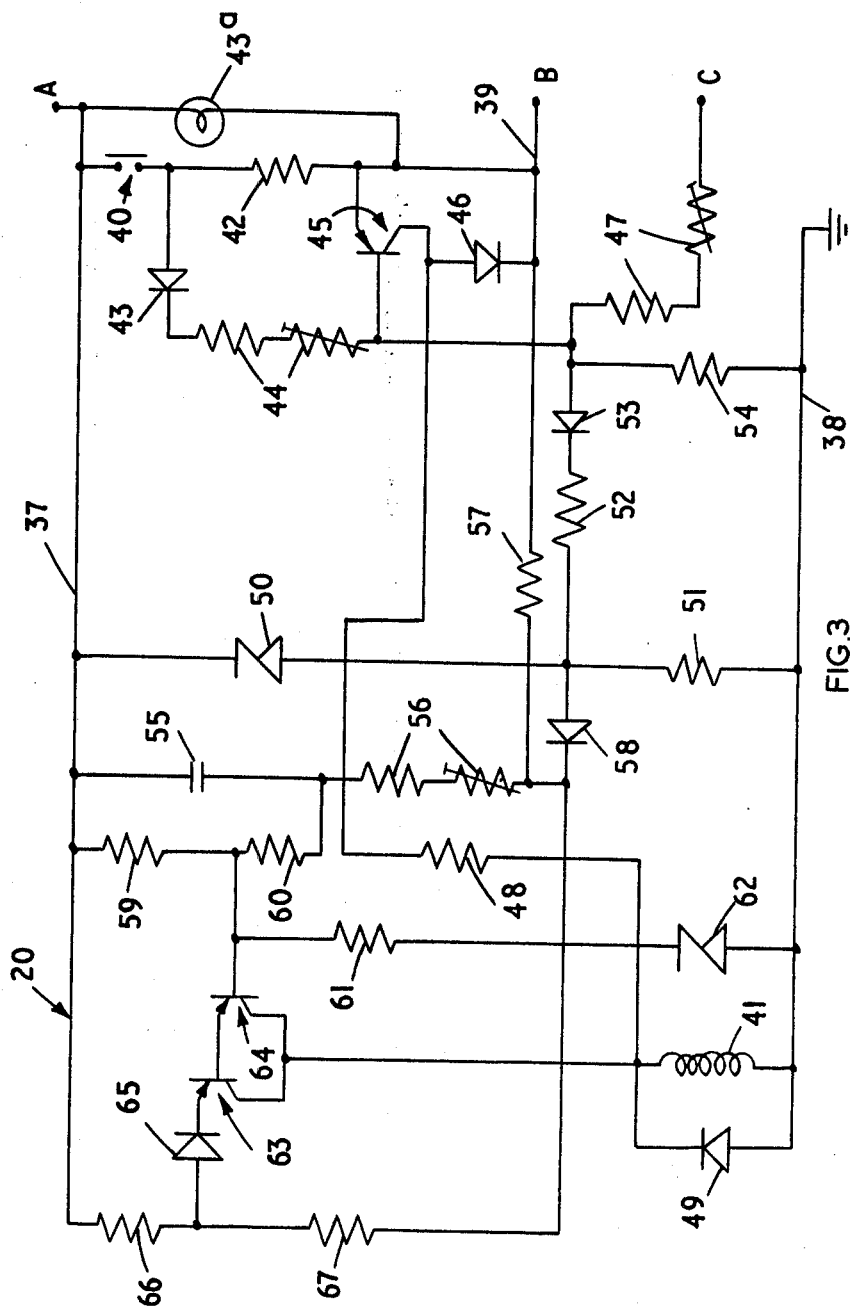
FIG. 3 shows the electrical circuit diagram of a portion of the system seen in FIG. 1.

With reference now to FIG. 3. This shows the circuit diagram of the intermittent switch 20. The points of connection are indicated at A, B and C in FIG. 3 and these are also indicated in FIG. 1.

The device 20 includes a line 37 which in the vehicle electrical system, is connected by way of the switch 15 to the positive terminal of the accumulator 10. Moreover, an earthline 38 is provided which is connected to the negative terminal of the accumulator, and an output line 39 which is connected to the lamps 22.

The device 20 includes an electro-magnetic relay having a normally open pair of contacts 40 and an operating coil 41. One of the fixed pair of contacts is connected to the line 37 whilst the other contact is connected by way of a resistor 42 to the line 39. Moreover, connected between the lines 37 and 39 is a warning lamp 43. A point intermediate the relay contacts 40 and the resistor 42 is connected to the anode of a diode 43, the cathode of which is connected by way of an adjustable series resistor 44 to the base of a p-n-p transistor 45. The emitter of this transistor is connected to the line 39, and the collector of the transistor is also connected to the line 39 by way of a diode 46. The base of transistor 45 is connected by way of an adjustable resistor combination 47 with the line 28 seen in FIG. 1, and the collector of transistor 45 is connected by way of resistor 48 to one end of the operating coil 41 of the relay. The other end of the operating coil of the relay is connected to the earth line 38, and in parallel with the coil is a diode 49.

The device also includes a Zener Diode 50 having its cathode connected to the line 37 and its anode connected to line 38 by way of a resistor 51. A point intermediate the Zener Diode and the resistor 51, is connected by way of a resistor 52 to the cathode of a diode 53, the anode of which is connected to one end of the resistor combination 47, and also to one end of a resistor 54, the other end of which is connected to the earth line 38.

Also provided is a capacitor 55 having one plate connected to the line 39, and its other plate connected to one end of an adjustable resistor combination 56, the other end of which is connected by way of a resistor 57 to the output line 39. A point intermediate the resistor combination 56 and the resistor 57 is connected to the cathode of a diode 58, the anode of which is connected to a point intermediate the Zener Diode 50 and the resistor 51. Furthermore, in parallel with the capacitor 55 is the series combination of resistors 59 and 60, and a point intermediate these resistors is connected by way of a resistor 61 to the cathode of a Zener Diode 62, the anode of which is connected to the earth line 38.

Also provided is a pair of transistors 63, 64 connected as a Darlington pair and the base of the input transistor is connected to the junction of resistors 59, 60 and 61. The collectors of the transistors 63 and 64 are connected to a point intermediate the resistor 48 and the operating coil of the relay 41 whilst the emitter of the output transistor is connected to the cathode of a diode 65, the anode of which is connected to a point intermediate a pair of resistors 66 and 67, the other end of the resistor 66 being connected to line 37 whilst the other end of the resistor 67 is connected to the cathode of the diode 58.

In operation, when switch 15 is closed, then the chain of resistors 57, 67 and 66 is brought into operation with Zener Diode 50 holding the potential across resistors 66 and 67. The potential of the emitter of transistor 63 is therefore raised. The capacitor 55 charges by way of resistor 56 until the potential across resistor 59 is sufficient to switch transistor 64 on. When this occurs transistor 63 is turned on and a current flow occurs through the operating coil 41 of the relay. This effects closure of the contacts 40 and the lamps 22 are illuminated by way of the resistor 42. In addition, the capacitor 55 is discharged through the parallel paths of resistors 59 and 60 and resistor combination 56 and at some point, transistor 64 is turned off, thereby turning transistor 63 off whereafter the cycle is repeated. During normal operation, transistor 45 is switched on as soon as the switch 15 is closed, but it ceases to conduct shortly after the relay contacts 40 have closed. This is because the lamp current flowing in the resistor 42 makes the potential of the emitter of transistor 45 more negative than the base thereof. In the event that one of the lamps 22 is faulty, then the total lamp current will not attain the level necessary to switch on transistor 45 and the current flowing in transistor 45 and hence in the operating coil 41 of the relay by way of resistor 48, will be sufficient to maintain the contacts 40 closed so that an indication of failure of the circuit will be given by the warning lamp 43 remaining extinguished and by the fact that the lamps 22 will remain illuminated.

If the circuit is normally adjusted to sense the current flow throught two lamps 22, then when lamp 24 is connected it is quite clear that failure of one of these lamps could occur without any indication being provided by the circuit. The value of resistor 54 is important in determining at what point the transistor 45 conducts, and it is arranged that when an additional lamp is connected that the resistor combination 47 is effectively placed in parallel with the resistor 54 thereby to modify the operating point of the transistor 45.

The connection of the resistor combination 47 in parallel with the resistor 54 has been effected in prior art arrangements, by means of an earthing link which is inserted when the trailer is connected to the tractor. In the present arrangement however, the resistor combination 47 is effectively connected in parallel with the resistor 54, either by means of the diode 26 and the lamp 25 is in the cold or extinguished condition, or by way of the contacts 27 when the lamp 25 is in the hot or illuminated state.

I claim:

1. A vehicle electrical system comprising a load sensitive unit which controls current flow from a first point of electric supply on the vehicle to a first lamp on the vehicle, the system being adapted to have a second lamp connected in parallel with the first lamp, a third lamp associated with said second lamp, a second point of electric supply on the vehicle, said third lamp when said second lamp is connected in parallel with said first lamp, is connected to said second point of electric supply of the vehicle, and sensing means for sensing the connection of said third lamp to said second point of electric supply, said sensing means acting to modify the operating characteristics of said unit.

2. A system as claimed in claim 1 in which said means comprises a first part operative to sense said connection when said third lamp is extinguished and a second part operative to sense said connection when said third lamp is illuminated.

3. A system as claimed in claim 1 in which said means comprises a first part operative to sense the continuity of said third lamp when it is extinguished and a second part operative to sense the current flowing in said third lamp when it is illuminated.

4. A system as claimed in claim 3 including a modifying terminal on said device and a diode constituting said first part and being connected between said modifying terminal and said second point of electrical supply.

5. A system as claimed in claim 4 including a further diode through which said second point of electric supply is connected to a source of electric supply on the vehicle.

6. A system as claimed in claim 5 in which said second part of said means comprises current sensing means for sensing current flow in said third lamp and switch means operable when current flow is sensed for connecting said modifying terminal to a common terminal of said electric supply whereby the operating characteristics of said unit are altered.

7. A system as claimed in claim 6 in which said current sensing means comprises the operating coil of a relay and said switch means comprises a normally open pair of contacts of said relay.

8. A system as claimed in claim 6 in which said current sensing means comprises a first transistor which is turned on when current flow to said third lamp occurs and said switch means comprises a second transistor which is turned on when said first transistor is turned on.

9. A system as claimed in claim 8 in which said first transistor is responsive to the voltage developed across said further diode and a resistor in series therewith.

* * * * *